US012685368B2

(12) United States Patent
Font Calafell et al.

(10) Patent No.: US 12,685,368 B2
(45) Date of Patent: Jul. 21, 2026

(54) MODULAR INSOLES

(71) Applicant: Peridot Print LLC, Palo Alto, CA (US)

(72) Inventors: Davinia Font Calafell, Sant Cugat del Valles (ES); Bernat Poll Crespo, Sant Cugat del Valles (ES); Cristina Dominguez Manchado, Sant Cugat del Valles (ES); Lluis Hierro Domenech, Sant Cugat del Valles (ES); Jordi Casellas Lopez, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 0 days.

(21) Appl. No.: 18/704,891

(22) PCT Filed: Oct. 29, 2021

(86) PCT No.: PCT/US2021/057416
§ 371 (c)(1),
(2) Date: Apr. 25, 2024

(87) PCT Pub. No.: WO2023/075796
PCT Pub. Date: May 4, 2023

(65) Prior Publication Data
US 2025/0009072 A1     Jan. 9, 2025

(51) Int. Cl.
*G06F 30/17* (2020.01)
*A43B 17/00* (2006.01)
*G06F 113/10* (2020.01)

(52) U.S. Cl.
CPC ............ *A43B 17/006* (2013.01); *G06F 30/17* (2020.01); *G06F 2113/10* (2020.01)

(58) Field of Classification Search
CPC .................................................... G06F 2111/16
See application file for complete search history.

(56) References Cited

U.S. PATENT DOCUMENTS

| | | | |
|---|---|---|---|
| 2,050,973 | A | 8/1936 | Kurtz |
| 2,075,943 | A | 4/1937 | Howell |
| 2,095,532 | A | 10/1937 | Joseph |
| 4,045,886 | A | 9/1977 | Terasaki |
| 5,138,774 | A | 8/1992 | Sarkozi |
| 5,400,528 | A | 3/1995 | Skinner et al. |
| 6,125,557 | A | 10/2000 | Brown |

(Continued)

FOREIGN PATENT DOCUMENTS

| | | |
|---|---|---|
| EP | 1804599 B1 | 8/2013 |
| GB | 0892156 A | 3/1962 |

(Continued)

*Primary Examiner* — Nathan L Laughlin
(74) *Attorney, Agent, or Firm* — Michael Dryja

(57) ABSTRACT

A modular insole for an article of footwear is disclosed. The modular insole comprises a shell portion having a first surface arranged to face a foot of a wearer of the article of footwear and a second surface arranged to face away from the foot of the wearer; and a stiffening element capable of being removably coupled to the second surface of the shell portion and arranged to modify a stiffness of the modular insole when the stiffening element is coupled to the shell portion. A method and a machine-readable medium are also disclosed.

6 Claims, 7 Drawing Sheets

(56) References Cited

U.S. PATENT DOCUMENTS

| | | | |
|---|---|---|---|
| 7,069,665 B1 | 7/2006 | Adriano | |
| 7,210,250 B2 | 5/2007 | Gallegos | |
| 7,707,751 B2 | 5/2010 | Avent et al. | |
| 8,453,346 B2 | 6/2013 | Steszyn et al. | |
| 9,107,472 B2 | 8/2015 | Donzis et al. | |
| 9,668,537 B2 | 6/2017 | Pedersen et al. | |
| 10,383,400 B2 | 8/2019 | Bauerfeind | |
| 10,463,113 B2 | 11/2019 | Manz et al. | |
| 11,090,182 B1 * | 8/2021 | DiNucci | A43B 7/1468 |
| 2004/0194344 A1 | 10/2004 | Tadin | |
| 2007/0039209 A1 | 2/2007 | White et al. | |
| 2007/0043582 A1 * | 2/2007 | Peveto | A43B 23/027 |
| | | | 705/26.1 |
| 2007/0289170 A1 * | 12/2007 | Avent | A61F 5/14 |
| | | | 36/173 |
| 2009/0282701 A1 | 11/2009 | Yamamoto | |
| 2010/0031533 A1 | 2/2010 | Keenan et al. | |
| 2011/0041360 A1 | 2/2011 | Torrance et al. | |
| 2011/0219644 A1 | 9/2011 | Cohen | |
| 2011/0265346 A1 | 11/2011 | Ballantyne | |
| 2014/0109439 A1 | 4/2014 | Barr | |
| 2016/0374431 A1 * | 12/2016 | Tow | A43D 1/022 |
| | | | 36/43 |
| 2018/0310663 A1 | 11/2018 | Bradley | |
| 2019/0125032 A1 | 5/2019 | Liu | |
| 2020/0008522 A1 | 1/2020 | Kim | |
| 2020/0107612 A1 * | 4/2020 | Schickling | A43B 17/00 |
| 2020/0163413 A1 | 5/2020 | Cran | |
| 2021/0112912 A1 | 4/2021 | Choi et al. | |
| 2021/0186155 A1 * | 6/2021 | Cruise | A43B 7/1464 |

FOREIGN PATENT DOCUMENTS

| | | |
|---|---|---|
| GB | 1537080 A | 12/1978 |
| RU | 10078 U1 | 6/1999 |
| WO | 2006/054369 A1 | 5/2006 |
| WO | 2007/136868 A2 | 11/2007 |
| WO | 2010/030186 A1 | 3/2010 |
| WO | 2021/156717 A1 | 8/2021 |

* cited by examiner

MODULAR INSOLES

BACKGROUND

An article of footwear, such as a shoe, may include an insole to provide a cushioned surface for a wearer's foot during use. An insole provided with a shoe may be manufactured according to a generic design, intended to suit the foot of an average person.

Advances in additive manufacturing technology have made it possible to manufacture many objects using additive manufacturing techniques. One such technique involves the selective solidification of portions of successive layers of build material to form an intended object.

BRIEF DESCRIPTION OF DRAWINGS

Examples will now be described, by way of non-limiting example, with reference to the accompanying drawings, in which.

DETAILED DESCRIPTION

Various examples disclosed herein provide a modular insole or orthotic that can be personalized or manufactured in a bespoke manner in order to suit an individual. Examples disclosed herein also provide a mechanism by which such a modular insole or orthotic can be designed and manufactured.

An insole, sometimes referred to as a shoe insert, footbed or inner sole, is a part of an article of footwear, such as a shoe, that provides cushioning and support to the foot of a wearer of the footwear. An insole, which may be removable from an article of footwear, may have a shape and size that generally conforms with the shape and size of this article of footwear in which the insole is to be used. An upper surface of the insole may include contours intended to conform with the shape of a sole of a person's foot. However, there is great variation in the shapes of people's feet and, in particular, in the shape of the different people's soles. Thus, an insole supplied with a shoe may not be suitable for use by everyone.

According to the present disclosure, a modular insole is provided that includes multiple parts or modules that can be tailored for a particular foot. Moreover, individual modules of the modular insole can be replaced to take account of changes in a person's foot, such as changes in the size or shape of a person's foot or changes due to medical conditions or injury. According to various examples, a module of the modular insole may serve to modify a stiffness of the modular insole. For example, the modular insole may include a flexible portion intended to receive and engage a person's foot (e.g., wearing a sock or otherwise) during use, and a stiffening element intended to modify the stiffness of the modular insole, when the stiffening element is attached to the flexible portion.

As used herein, an "article of footwear" is intended to refer to any type of article of footwear including, for example, a shoe, a boot, a sandal, a flip-flop, a high-heeled shoe, or the like. The modular insole may, in some examples, comprise an orthotic, or modular orthotic, intended to assist with the treatment of a condition affecting the function of a body part, such as a person's foot.

Figure 1A:
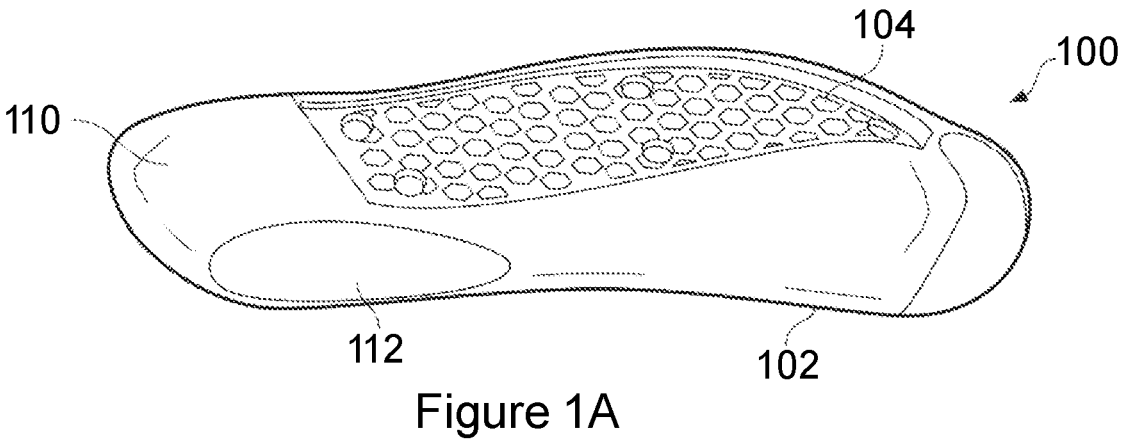
FIGS. 1A to 1E are illustrations of various examples of a modular insole.
Figure 1B:
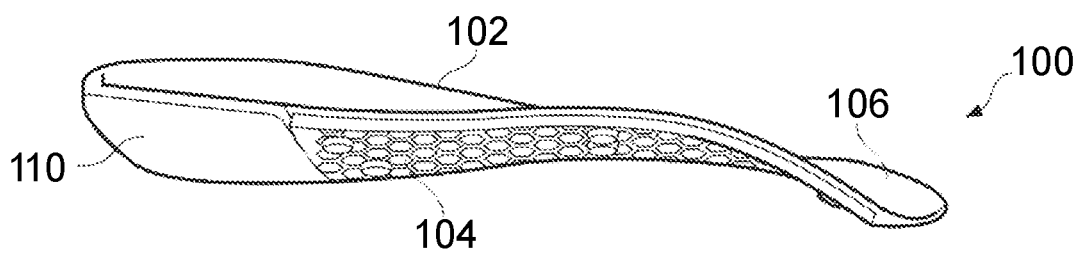
Figure 1C:
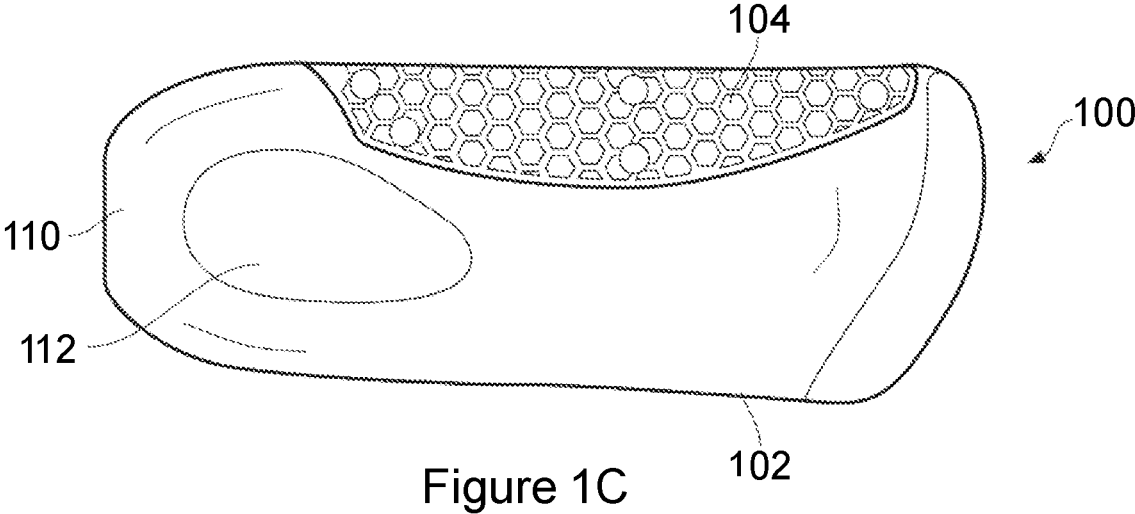
Figure 1D:
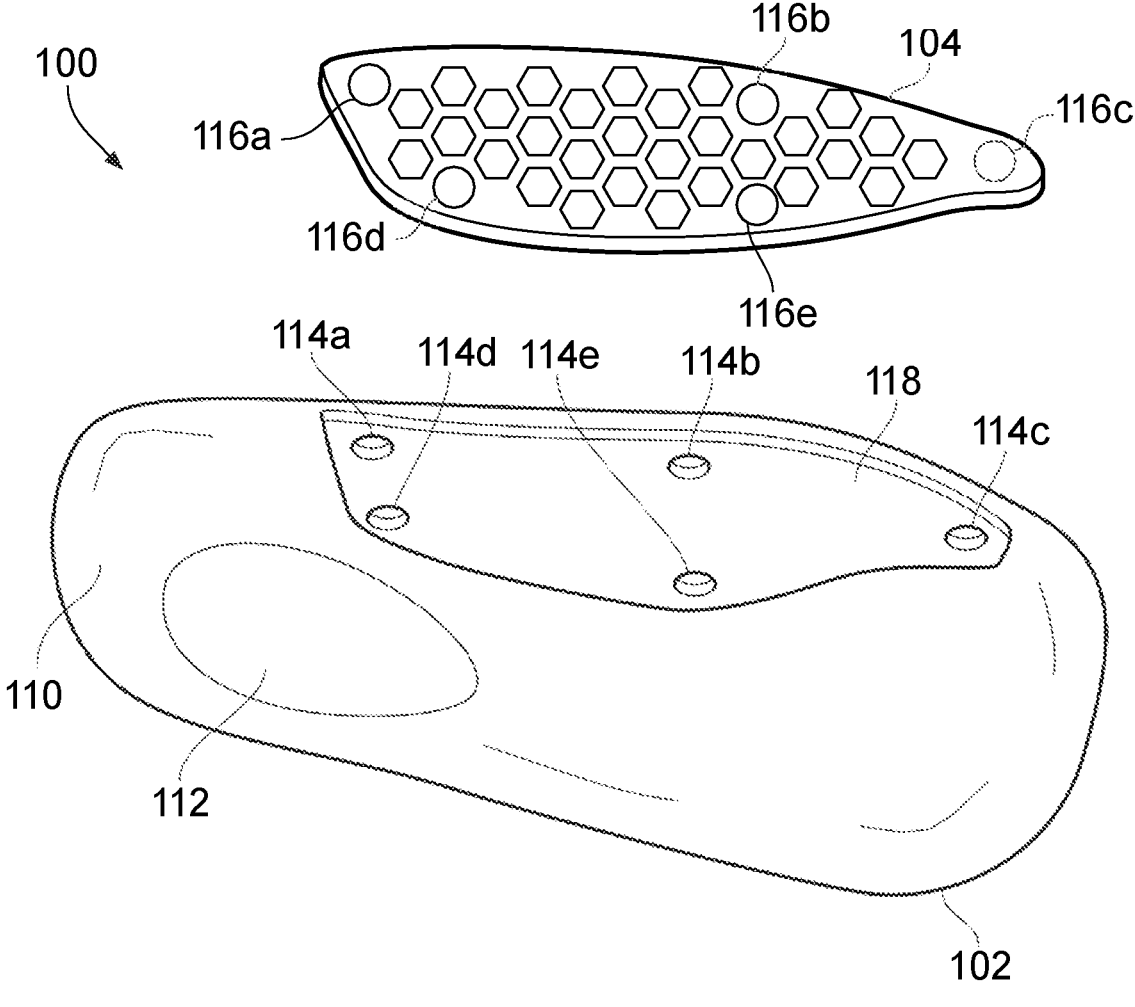
Figure 1E:
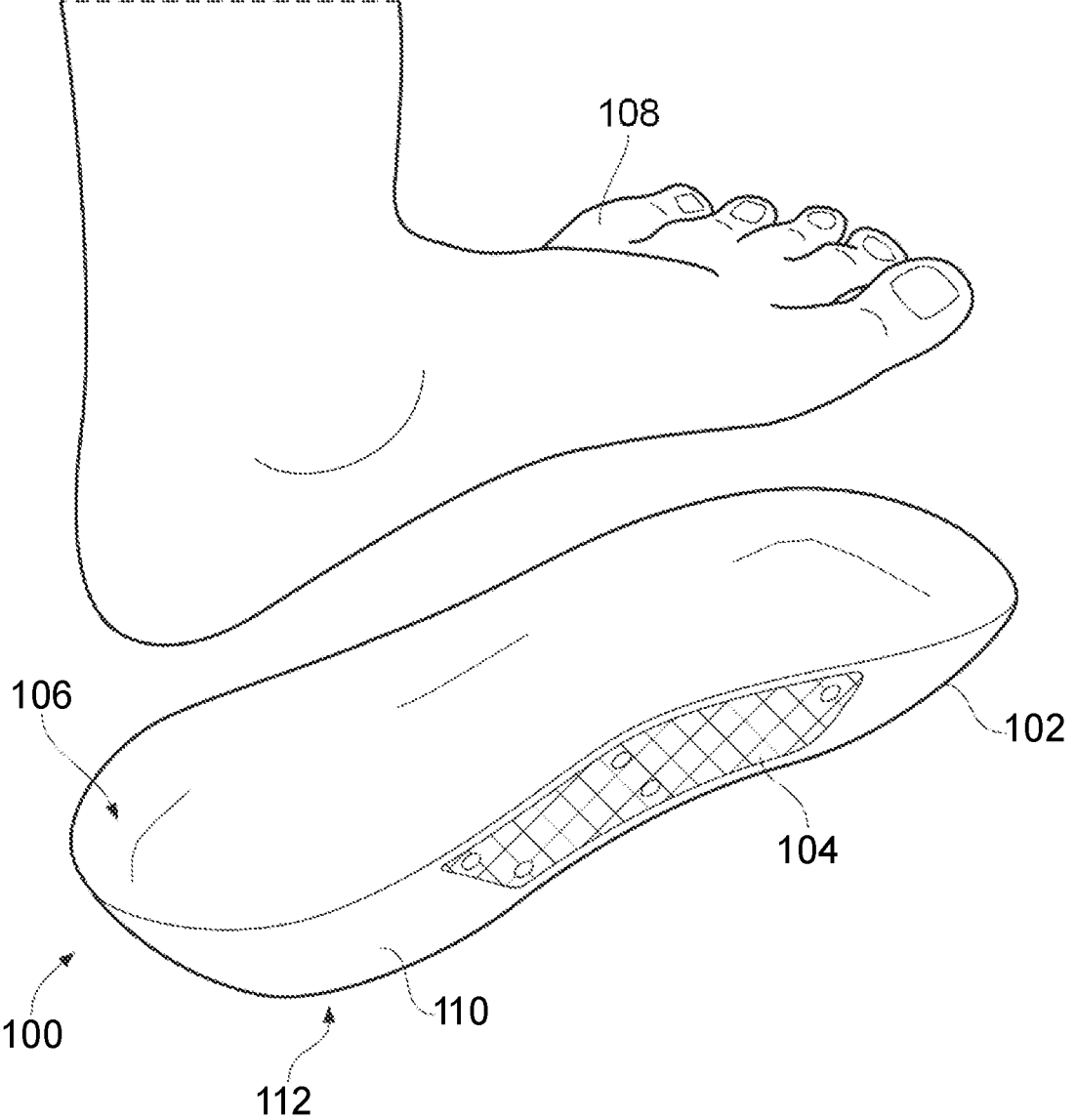

Referring now to the drawings, FIGS. 1A-1E include illustrations of examples of a modular insole 100 for an article of footwear. The modular insole comprises a shell portion 102 and a stiffening element 104. FIG. 1A is a lower, side view of the stiffening element 104 coupled to the shell portion 102; FIG. 1B is a side view of the stiffening element 104 coupled to the shell portion 102; and FIG. 1C is a bottom view of the stiffening element 104 coupled to the shell portion 102. FIG. 1D is a side view of the stiffening element 104 uncoupled (i.e., detached) from the shell portion 102. FIG. 1E is a perspective view of the stiffening element 104 coupled to the shell portion 102, beneath a foot of a person. The shell portion 102 may, in some examples, comprise a flexible base on which a wearer of the article of footwear places their foot, providing cushioning and support to the foot. As such, the shell portion 102 may be formed of a compressible and deformable material, such as foam. The shell portion 102 has a first surface 106 arranged to face a foot 108 of a wearer of the article of footwear and a second surface 110 arranged to face away from the foot 108 of the wearer. The first surface 106 may, in some examples, comprise a surface of an insole cover (not shown) formed, for example, from a material having non-slip properties (e.g., a material such as neoprene, polyethylene, fabric or the like).

The stiffening element 104 is capable of being removably coupled to the second surface 110 of the shell portion 102 and is arranged to modify a stiffness of the modular insole 100 when the stiffening element is coupled to the shell portion. As such, the stiffening element 104 may, for example, be formed of a stronger, more rigid and/or less flexible material than the material used to form the shell portion 102.

The stiffening element 104 may change a property (e.g., rigidity and/or stiffness) of the shell portion 102 and, therefore, of the modular insole 100 or a part thereof, when it is coupled to the shell portion. However, it may be intended that, by removably coupling the stiffening element 104 to a surface that does not face the foot 108 of the wearer of the article of footwear (i.e., a surface that faces away from the foot of the wearer) the stiffening element does not have an adverse effect on the comfort provided by the modular insole 100 to its wearer. In other words, by positioning the stiffening element 104 on a surface of the shell portion 102 that faces away from the foot 108 of the wearer (e.g., a lower surface) the wearer's foot will not feel the stiffening element directly; rather, the user should experience the beneficial effects of the stiffening element being attached to the shell portion.

The shell portion 102 and the stiffening element 104 may have features enabling the stiffening element to be removably coupled to any part of the second surface of the shell portion, such that the stiffening element may provide additional support (e.g., increased stiffness and/or rigidity) at any region of the modular insole 100. In one example, the stiffening element 104 may comprise an arch support stiffening element. Thus, the stiffening element 104 may be removably coupled to the shell portion 102 in a position corresponding to an arch of the wearer's foot 108. Such an arch support stiffening element 104 may be coupled to a region corresponding to a medial arch of the wearer's foot 108, a region corresponding to a lateral arch of the wearer's foot or a region corresponding to a transverse arch of the wearer's foot. The intended positioning of the stiffening element 104 may be selected based on the intended effect of providing the additional support In some examples, multiple stiffening elements 104 may be removably coupled to the shell portion 102 in order to provide a stiffening effect at multiple positions. For example, a first stiffening element 104 may be removably coupled to a region of the shell portion 102 that corresponds to a medial arch of the wearer's foot 108, and a second stiffening element may be removably coupled to a region of the shell portion that corresponds to a lateral arch (i.e., along an outer edge) of the wearer's foot.

In the examples shown in FIG. 1A-1E, the first surface 106 of the shell portion 102, which is arranged to face the sole of the wearer's foot 108 when the modular insole 100 is in use in an article of footwear, may comprise or be referred to as an upper surface. The shell portion 102 may further comprise a lower surface 112 opposite to the upper surface 106. In other words, the upper surface 106 may be considered to be a surface at the top of the modular insole 100 and the lower surface 112 may be considered to be a surface at the bottom of the modular insole. The lower surface 112 may be defined in a plane that is substantially parallel to at least a portion of the upper surface 106. The second surface 110 may comprise a lateral wall extending between the upper surface 106 and the lower surface 112. The second surface 110 may be curved or contoured and, may in some examples, include a planar portion or planar portions.

The stiffening element 104 may have a form or shape substantially conforming with and/or matching that of the region of the shell portion 102 to which it is to be removably coupled. Thus, a surface of one side of the stiffening element 104 may be in contact with the shell portion 102 when the stiffening element is removably coupled thereto.

The stiffening element 104 may be removably coupled to the shell portion 102 using any suitable connection or coupling mechanism. In some examples, the shell portion 102 may comprise a first connection element 114a. In the example shown in FIGS. 1D, the shell portion 102 includes five connection elements 114a to 114e. The stiffening element 104 may comprise a second connection element 116a, complementary to the first connection element 114a, such that the stiffening element is capable of being removably coupled to the shell portion 102 using the first and second attachment elements. In the example shown in FIG. 1D, the stiffening element 104 includes five connection elements 116a to 116e. Coupling of the stiffening element 104 to the shell portion 102 may be achieved by aligning each connection element of the stiffening element to its corresponding connection element of the shell portion (e.g., 114a with 116a, 114b with 116b, and so on). While the example of FIG. 1D shows five connection elements (i.e., five first connection elements 114a-114e and five second connection elements 116a-116e), in other examples, fewer (e.g., one, two, three or four) connection elements or more than five connection elements may be provided.

In some examples, the shell portion 102 may include a recess 118, as shown for example in FIG. 1D, for receiving the stiffening element 104. In some examples, the geometry of the recess 118 is such that, once the stiffening element 104 is attached, an outer face of the insole 100 is a conformal surface.

Each of the first and second connection elements 114a-114e, 116a-116e may comprise a connection element selected from a group comprising: a clip; a snap-fit connector, a hook-and-loop type connector, and a magnet. For example, complementary clip connectors may be provided on the shell portion 102 and the stiffening element 104 enabling the stiffening element to be clipped into position on the shell portion. A snap-fit connection may be provided by a protrusion on the shell portion 102, which is to engage with a complementary aperture or recess provided in the stiffening element 104. A hook-and-loop type connection may be provided with one of the shell portion 102 and the stiffening element provided with suitable hook connectors and the other of the shell portion and the stiffening element provided with suitable loop connectors, such that a removable coupling is achieved when the hook connectors and the loop connectors engage one another. A magnetic connection may be achieved using a magnet positioned on the stiffening element 104 to engage and magnetically couple to a complementary magnet (i.e., of opposite polarity) positioned on the shell portion 102. Magnetic connection elements may further assist with positioning the stiffening element 104 in an intended position and/or orientation with respect to the shell portion 102.

Figures 2A, 2B, 2C, 2D:
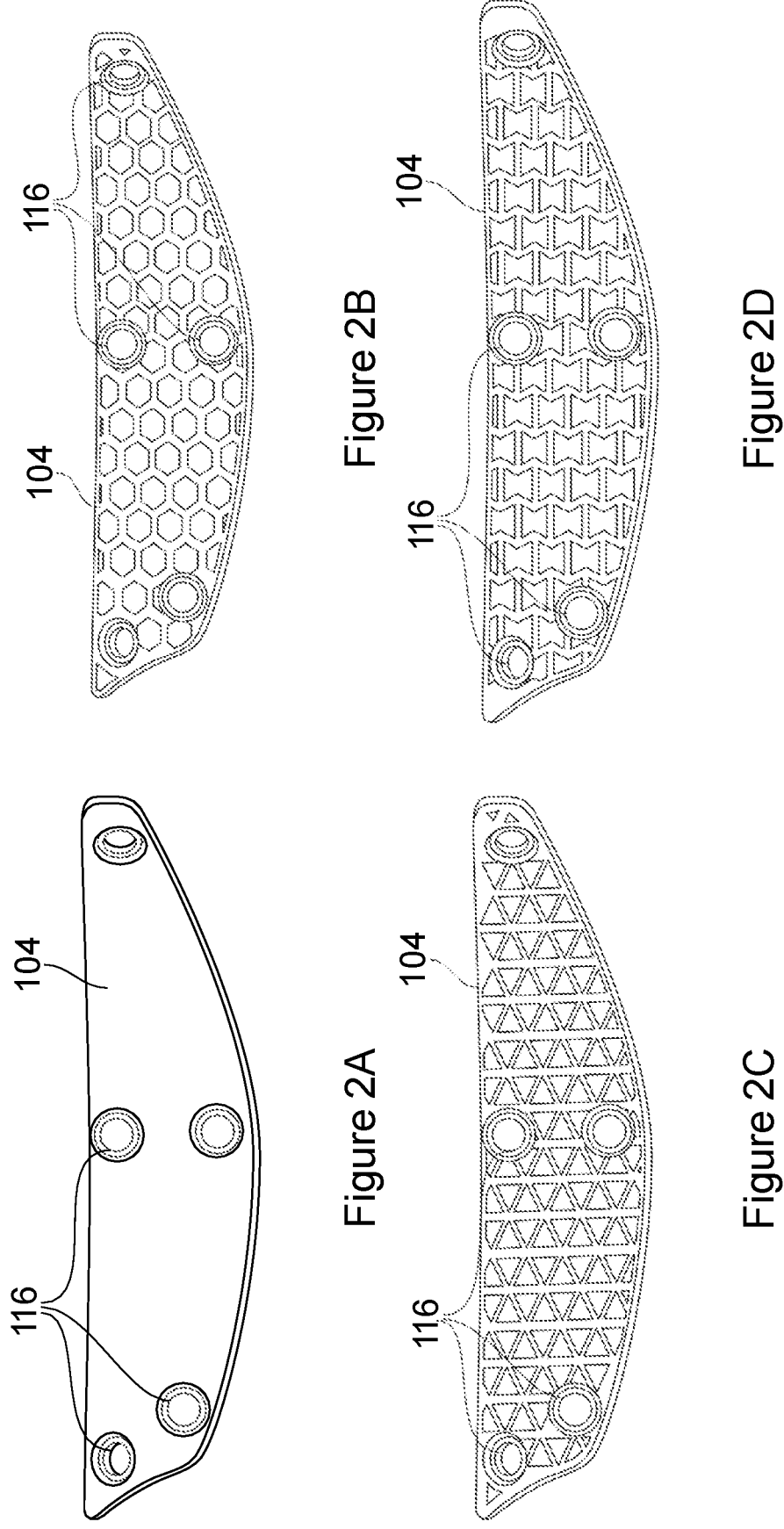
FIGS. 2A to 2D are illustrations of various examples of stiffening elements for a modular insole.

As noted above, the stiffening element 104 is intended to modify a stiffness and/or rigidity of the modular insole 100 when the stiffening element is coupled to the shell portion 102. The stiffening effect provided by the stiffening element 104 may depend on the size, shape and/or structure of the stiffening element. Thus, parameters of the stiffening element 104 may be selected based on the intended stiffening effect. FIGS. 2A-2D show examples of stiffening elements 104 having four different structures that may be used to achieve different stiffening effects. FIG. 2A shows a stiffening element 104 having a solid structure, in which the stiffening element is formed generally of a solid structure, with the connection elements 116 formed through the solid stiffening element.

FIGS. 2B, 2C and 2D shows stiffening elements 104 having different lattice structures. A lattice structure includes a repeating pattern or series of shapes, such that the stiffening elements 104 shown in FIGS. 2B, 2C and 2D comprise a series of apertures or cells of different shapes. The shape of the apertures, the size and number of apertures, the location of the apertures and the thickness of the walls between adjacent apertures affect the stiffening effect of the stiffening element 104 and, therefore, these parameters may be selected based on the intended stiffening effect of the stiffening element. A stiffening element 104 having a lattice structure may be considered to comprise a plurality of hollow cells, each hollow cell defined by a wall or by multiple walls. The shape of each hollow cell is defined by the shape and/or number of walls defining the cell.

FIG. 2B shows a stiffening element 104 having a honeycomb structure, similar to, and sometimes referred to as a hexagonal lattice structure. In this example, the stiffening element 104 is formed of a series of hexagonal apertures. FIG. 2C shows a stiffening element 104 having a triangular lattice structure, in which the stiffening element is formed of a series of triangular apertures. FIG. 2D shows a stiffening element 104 having a re-entrant honeycomb structure, similar to, and sometimes referred to as a re-entrant hexagonal lattice structure, in which the stiffening element is formed of a series of re-entrant hexagons. In other examples, other lattice structures (e.g., structures formed of a series of other shapes) may be used.

Regardless of the structure of the stiffening element 104, the stiffening element may include a portion or portions that are hollow for example, the stiffening element 104 shown in FIG. 2A may comprise a partially hollow or completely hollow shell. Similarly, in the examples shown in FIGS. 2B, 2C and 2D, the walls between the adjacent shapes may be hollow or include hollow portions.

Figures 3A, 3B, 4A, 4B, 4C:
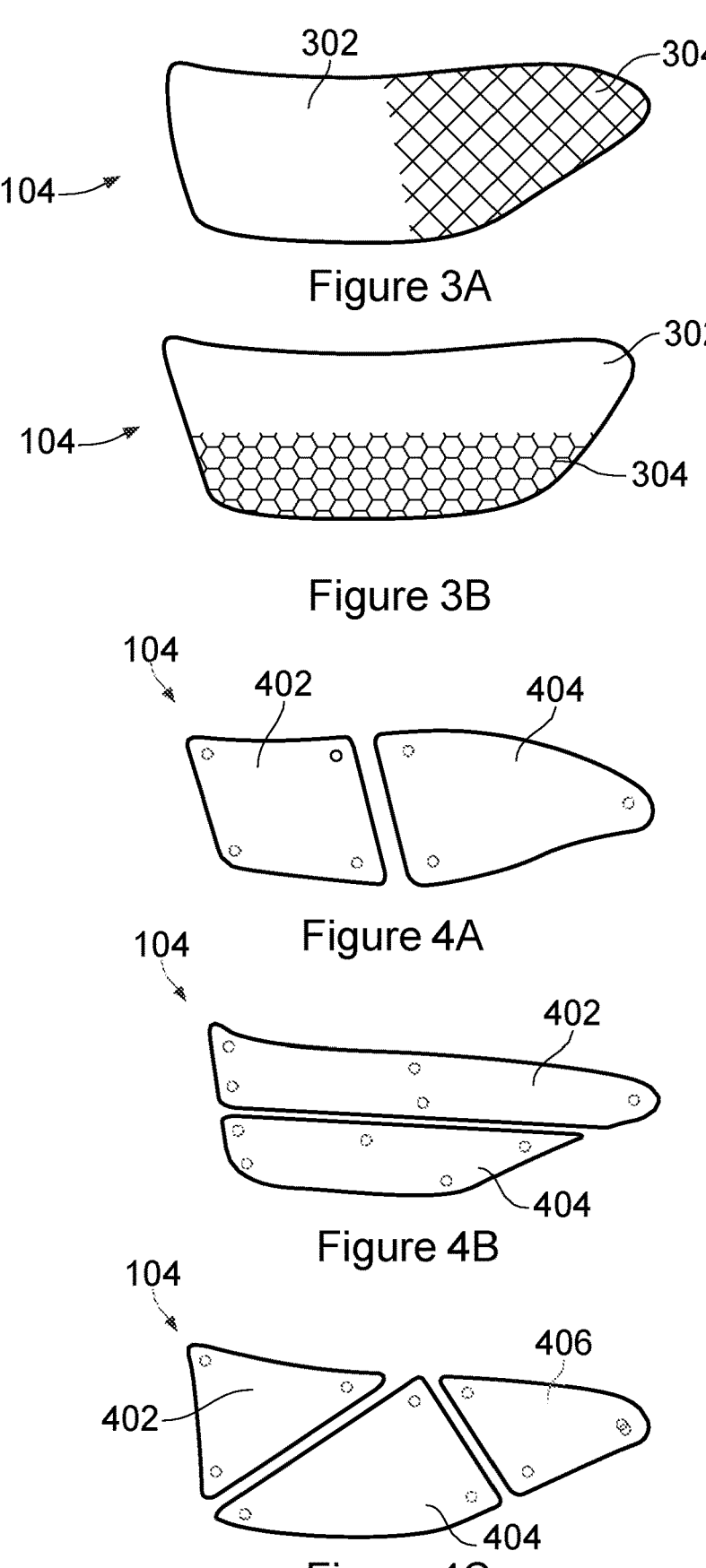
FIGS. 3A and 3B are illustrations of further examples of stiffening elements for a modular insole.
FIGS. 4A to 4C are illustrations of further examples of stiffening elements for a modular insole.

In the examples shown in FIGS. 2A-2D, each of the stiffening elements 104 is formed of a single structure. However, in other examples, the stiffening element 104 may be formed of multiple structures. Thus, the stiffening element 104 may comprise a first region having a first structure and a second region having a second structure, different to the first structure. In some examples, the stiffening element 104 may comprise more than two regions, each region having a different structure. FIGS. 3A and 3B show examples of stiffening elements 104, each formed of multiple different structures. In the example shown in FIG. 3A, the stiffening element 104 includes a first region 302 having a solid structure, and a second region 304 having a triangular lattice structure. In this example, the second region 304 of the stiffening element 104 is towards a front end of the stiffening element, such that the triangular lattice structure is located towards the front end of the modular insole 100 when coupled to the shell portion 102. In this way, the stiffening element 104 may provide greater support/rigidity to the rear of the shell portion 102 as a result of the solid structure at its rear end (i.e., the first region 302) and a relatively lower support/rigidity to front of the shell portion as a result of the lattice structure at its front end (i.e., the second region 304).

In the example shown in FIG. 3B, the first region 302 of the stiffening element 104, which has a solid structure, is located towards an upper region of the stiffening element, and the second region 304, having a honeycomb structure in this example, is located towards a lower region of the stiffening element. In this way, the stiffening element 104 may provide greater support/rigidity to the upper portion of the shell portion 102 as a result of the solid structure at its upper region (i.e., the first region 302) and a relatively lower support/rigidity to the lower portion of the shell portion as a result of the lattice structure at its lower region (i.e., the second region 304).

Thus, by forming the stiffening element 104 with regions having different structures, it is possible to tailor the position of the stiffening effect and the amount of stiffening provided by different regions of the stiffening element. In the examples shown in FIGS. 3A and 3B, each of the stiffening elements 104 is formed with two different structures. In other examples, a stiffening element 104 may include three or more different structures, so as to provide greater customization of the modular insole 100 as a result of the rigidity provided by the stiffening element.

In the examples discussed above with reference to FIGS. 3A and 3B, each stiffening element 104 comprises a single element, which can be coupled to or removed from the shell portion 102. In some examples, however, the stiffening element 104 may itself comprise multiple discrete stiffening elements, each separable from one another. Thus, in some examples, the first region 302 and the second region 304 may comprise separate, discrete stiffening elements, each capable of being separately removably coupled to the shell portion 102.

FIGS. 4A-4C show three examples of stiffening elements 104, each comprising multiple discrete stiffening elements, also referred to as sub-elements. In FIG. 4A, the stiffening element 104 comprises a first sub-element 402 and located towards its rear and a second sub-element 404 located towards its front. In FIG. 4B, the stiffening element 104 comprises the first sub-element 402 located towards its upper region and the second sub-element 404 located towards is lower region. In FIG. 4C, the stiffening element 104 comprises the first sub-element 402, the second sub-element 404 and a third sub-element 406 arranged along its length. The stiffening element 104 may include any number of sub-elements (i.e., discrete stiffening elements) arranged in any suitable manner to achieve the intended stiffening effect in the modular insole 100. Similarly, each sub-element of the stiffening element 104 may have any structure (e.g., solid, lattice, or the like), and may be formed of a single structure or multiple structures. Each sub-element may include a connection element 116 or multiple connection elements (e.g., 116a-116e) to enable it to be removably coupled to the shell portion 102 independently of each other sub-element in the stiffening element 104. In this way, if it is determined, for example after a period of time during which multiple sub-elements of a stiffening element 104 have been coupled to the shell portion, that the stiffening effect should be reduced, then it is possible to remove a sub-element of the stiffening element, while leaving other sub-elements coupled to the shell portion to maintain a degree of stiffening.

As discussed in greater detail below, the shell portion 102 and/or the stiffening element 104 may be formed of build material that has been solidified during an additive manufacturing process. Additive manufacturing techniques enable objects to be generated according to particular parameters, enabling customization of objects such as the shell portion 102 and the stiffening element 104 of a modular insole 100 for different people. Examples of the customization available using additive manufacturing techniques include the type of build material used to generate the object, the size and shape of the object to be generated, the color of the object, and the like.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be Polyamide materials (e.g., PA12, PA11), Thermoplastic Polyurethane (TPU) materials, Thermoplastic Polyamide materials (TPA), Polypropylene (PP) and the like.

In some examples, selective solidification is achieved through directional application of energy, for example using a laser or electron beam which results in solidification of build material where the directional energy is applied. In other examples, print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

According to one example, a suitable fusing agent may be an ink-type formulation comprising carbon black. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber.

In other examples, coalescence may be achieved in some other manner.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figures 5, 6:
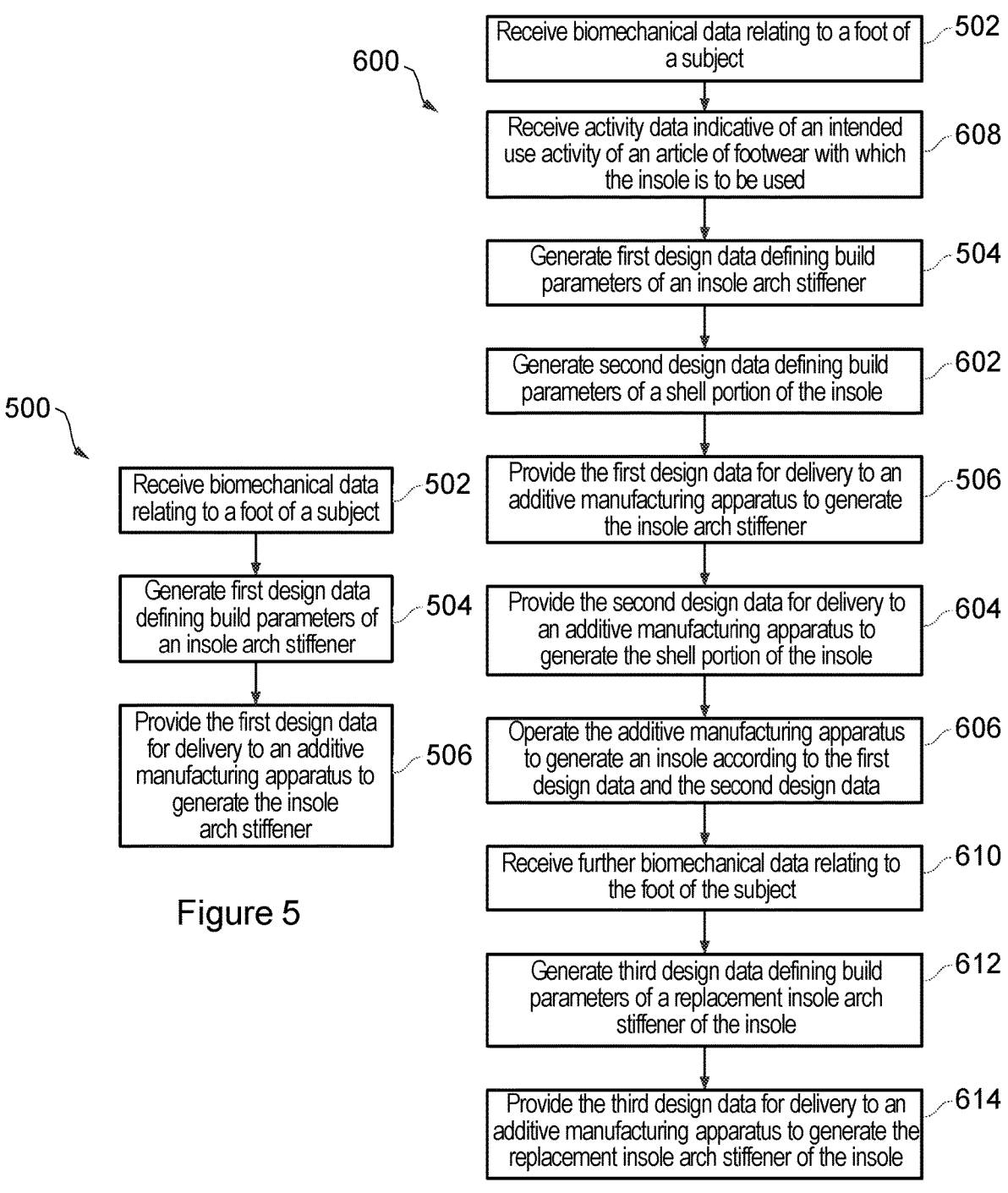
FIG. 5 is a flowchart of an example of a method of designing an insole arch stiffener.
FIG. 6 is a flowchart of a further example of a method of designing an insole arch stiffener.

Examples of the present disclosure also provide a method, such as a method for designing an insole arch stiffener or a stiffening element 104. FIG. 5 is a flowchart of an example of a method 500. The method 500 may, in some examples, comprise a computer-implemented method. The method 500 comprises, at block 502, receiving biomechanical data relating to a foot 108 of a subject. In some examples, the biomechanical data relating to the foot 108 of the subject may be obtained or acquired using an imaging device, such as a camera, a scanning device, such as a 3D scanner, or the like. In other examples, the biomechanical data may be received from some other source, for example a database storing data associated with a subject. The biomechanical data may include data describing parameters of the subject's foot 108, including, for example, data describing a size, a shape, a height, a width and/or a structure of the foot. In some examples, the biomechanical data may include data relating to just a portion of the subject's foot 108, such as the sole of the foot while, in other examples, data relating to other portions of the foot may be received.

At block 504, the method 500 comprises generating, based on the received biomechanical data, first design data defining build parameters of an insole arch stiffener 104, the insole arch stiffener capable of being removably coupled to a shell portion 102 of an insole 100 of an article of footwear, wherein the build parameters of the insole arch stiffener 104 include parameters to modify a stiffness of the insole when the insole arch stiffener is coupled to the shell portion. The insole arch stiffener 104 discussed herein may comprise the stiffening element discussed above when it is to be coupled to the shell portion 102 at a location corresponding to an arch of the subject's foot 108 (i.e., the wearer's foot). In some examples, it may be intended that the insole arch stiffener 104 to be generated is to be coupled to an existing shell portion 102, such as a shell portion that has been generated previously using additive manufacturing techniques.

The biomechanical data may, for example, include data defining an amount of movement of the subject's foot 108 while the subject is moving (e.g., walking or running), and the first design data may define build parameters of the insole arch stiffener 104 such that a stiffness of the insole is increased in a region corresponding to an arch of the subject's foot, when the insole arch stiffener is coupled to the shell portion 102 of the insole 100. In other examples, the biomechanical data may include data indicative of a muscle weakness in the subject's foot 108, and the first design data may define build parameters of the insole arch stiffener 104 such that a stiffness of the insole is modified (relative to a stiffness of the shell portion 102 when the insole arch stiffener is not coupled thereto) in such a way that the muscle in the subject's foot is supported, for example to improve muscle strength.

The method 500 comprises, at block 506, providing the first design data for delivery to an additive manufacturing apparatus to generate the insole arch stiffener 104. Thus, the first design data may comprise structural design data in a format that can be read, interpreted and/or executed by a processor associated with an additive manufacturing apparatus.

FIG. 6 is a flowchart of a further example of a method 600, which may comprise a method for designing an insole arch stiffener or a stiffening element 104. As with the method 500, the method 600 may comprise a computer-implemented method. The method 600 may comprise a block or blocks of the method 500 discussed above. In some examples, the method 600 may further comprise, at block 602, generating, based on the received biomechanical data, second design data defining build parameters of a shell portion 102 of the insole. Thus, in addition to generating the first design data defining build parameters of the insole arch stiffener 104, the biomechanical data may also be used for generating design data to build the shell portion 102. As shown in the examples of FIGS. 1A-1E, the shell portion 102 may include a first surface arranged to face the subject's foot 108 during use. Thus, the second design data may define build parameters used to generate a shell portion 102 having a first (upper) surface that conforms with the size and shape of the sole of the subject's foot 108. The first surface of the shell portion 102 may therefore include regions conforming to the ball of the person's foot 108 and an arch portion conforming to the shape of the arch of the person's foot.

The build parameters of the shell portion 102 may, for example, include details of a flexibility of the shell portion or regions thereof. The flexibility the shell portion 102 or part thereof may be modified (e.g., reduced) through the use of the insole arch stiffener 104, or through the use of a stiffening element coupled elsewhere to the shell portion.

The second design data defining build parameters of the shell portion 102 may incorporate build parameters for the recess 118 in the shell portion, to receive the stiffening element 104.

At block 604, the method 600 may further comprise providing the second design data for delivery to an additive manufacturing apparatus to generate the shell portion of the insole. In some examples, the first design data and the second design data may be generated simultaneously or sequentially based on the received biomechanical data, such that the build parameters of the shell portion 102 and the build parameters of the insole arch stiffener 104 are determined as part of a single processing block. Thus, the first design data and the second design data may be delivered together to the additive manufacturing apparatus.

The method 600 may further comprise, at block 606, operating the additive manufacturing apparatus to generate an insole 100 according to the first design data and the second design data. In some examples, the method 600 may comprise operating the additive manufacturing apparatus to generate an insole arch stiffener 104 according to the first design data and/or a shell portion 102 according to the second design data.

In addition to the received biomechanical data, other data may be used when determining or generating the first design data and/or the second design data. For example, the insole 100 may be designed (i.e., the first design data and/or the second design data may be generated) based on an intended use of an article of footwear in which the insole is to be used. Thus, at block 608, the method 600 may comprise receiving activity data indicative of an intended use activity of an article of footwear with which the insole is to be used. An example of such a use activity may include, for example, walking, running, football, or the like. The first design data and/or the second design data may be generated based further on the received activity data. In other examples, the first design data and/or the second design data may be generated based further on other data, such as data indicating the type of footwear with which the insole is intended to be used. For example, such data may indicate that the insole is intended to be used with walking shoes, football boots, high-heeled shoes, dress shoes, sandals, flip-flops, or the like. The first design data and/or the second design data may be generated such that the insole arch stiffener 104 and/or the shell portion 102 are bespoke or customized for a particular foot 108 of a person.

In some examples, the shell portion 102 of the insole may be designed and generated, for example using additive manufacturing techniques, and parameters (e.g., a stiffness or flexibility) of the shell portion may be modified using an insole arch stiffener 104 generated according to first design data that gives the insole arch stiffener particular intended properties. It may be intended that the insole arch stiffener 104 of the insole 100 is replaceable depending on the intended use of the insole. For example, a first insole arch stiffener 104 of an insole may be replaced with a second, different insole arch stiffener having different properties (e.g., generated according to different design data) in order to generate greater support in the arch portion of the insole 100, for example by providing a greater stiffening effect.

An insole arch stiffener 104 such as those disclosed herein may be designed, manufactured and coupled to an insole 100 as part of a treatment program (e.g., a medical treatment program), for example to aid recovery of an injury or a medical condition affecting the subject's foot 108. A medical professional may, for example, prescribe or recommend gradually increasing the stiffness of an insole 100 used by the user, over a period of days or weeks. Thus, rather than replacing the entire insole 100 each time a stiffer insole is to be used, the present disclosure enables a stiffer insole to be produced by replacing the insole arch stiffener 104 with one having different properties, intended to have a greater stiffening effect. As such, an intended stiffening effect can be achieved for a lower cost than if the entire insole is to be replaced each time. Moreover, replacing just the insole arch stiffener 104 of the insole 100 can result in lower wastage (e.g., of obsolete insoles).

Examples of the present disclosure also enable the stiffness of an insole 100 to be modified or updated in the event that characteristics of the subject's foot 108 change over time. For example, if the subject's foot 108 changes over a period of time, such that an insole 100 having a different stiffness is to be used by the subject, then the stiffness of the insole can be modified by replacing the insole arch stiffener 104, rather than replacing the entire insole 100. Thus, the method 600 may comprise, at block 610, receiving further biomechanical data relating to the foot 108 of the subject.

The further biomechanical data may be received, for example, from an imaging device, such as a 3D scanner or a camera, used to capture an image or scan data of the subject's foot 108. The further biomechanical data may, for example, be received sometime after the biomechanical data received at block 502.

At block 612, the method 600 may comprise generating, based on the received further biomechanical data, third design data defining build parameters of a replacement insole arch stiffener of the insole. The third design data may be similar to the first design data, and may take account of any changes that have occurred in the subject's foot 108 since the biomechanical data was received at block 502. The method 600 may comprise, at block 614, providing the third design data for delivery to an additive manufacturing apparatus to generate the replacement insole arch stiffener 104 of the insole 100. The replacement insole arch stiffener 104 is to replace the insole arch stiffener of the insole 100. The blocks 610, 612 and 614 may be repeated such that additional biomechanical data is received and used to generate further replacement insole arch stiffeners 104.

Blocks of the methods 500, 600 may be performed using a processor, such as a processor associated with or forming part of an additive manufacturing apparatus. In other examples, such a processor may form part of a computing device or part of a cloud-computing environment.

Figure 7:
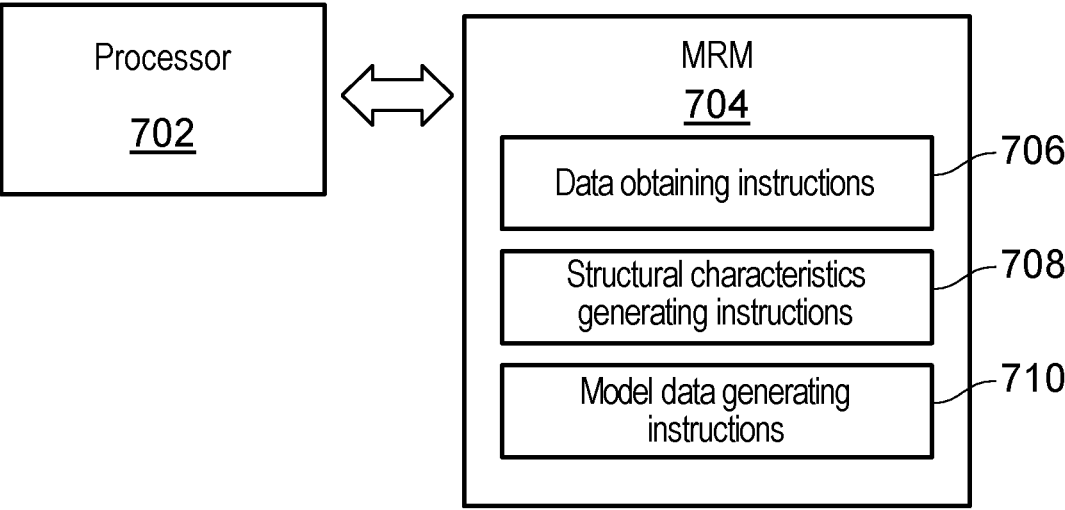
FIG. 7 is a schematic illustration of an example of a processor in communication with a machine-readable medium.

Examples in the present disclosure also provide a machine-readable medium. FIG. 7 is a schematic illustration of an example of a processor 702 in communication with a machine-readable medium 704. The machine-readable medium 704 comprises instructions (e.g., data obtaining instructions 706) which, when executed by processor 702, cause the processor to obtain data indicative of a biometric property of a foot 108 of a subject. The biometric property may, for example, comprise or be similar to the biomechanical data discussed above. The machine-readable medium 704 comprises instructions (e.g., structural characteristics generating instructions 708) which, when executed by processor 702, cause the processor to generate, based on the biometric property, structural characteristics of a rigidity plate of an orthotic, the rigidity plate capable of being removably coupled to a shell (e.g., the shell portion 102) of the orthotic, wherein the structural characteristics of the rigidity plate are such that a rigidity of the orthotic is modified when the rigidity plate is coupled to the shell, and wherein the rigidity plate of the orthotic is to be formed using an additive manufacturing apparatus. The rigidity plate may comprise or be similar to the stiffening element 104 and/or the insole arch stiffener discussed above. Similarly, the orthotic may comprise or be similar to the modular insole and/or the insole 100 discussed above. The machine-readable medium 704 comprises instructions (e.g., model data generating instructions 710) which, when executed by processor 702, cause the processor to generate model data representing the rigidity plate of the orthotic, the model data to be used by the additive manufacturing apparatus to form the rigidity plate of the orthotic during an additive manufacturing process.

Thus, examples in the present disclosure provide a modular insole or orthotic that can be customized to suit a person's foot 108 by replacing a stiffening element of the insole, that can be removably coupled to a shell portion of the insole. Both the stiffening element and the shell portion can be manufactured using additive manufacturing techniques, and this enables the components of the insole to be generated specifically to suit the size and shape of the subject's foot 108, as well as the intended use of the insole.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computer-implemented method comprising:
receiving biomechanical data relating to a foot of a subject;
generating, based on the received biomechanical data:
first design data defining build parameters of a shell portion of an insole for an article of footwear;
second design data defining build parameters of an insole arch stiffener of the insole, the insole arch stiffener removably couplable to the shell portion, wherein the build parameters of the insole arch stiffener include parameters to modify a stiffness of the insole when the insole arch stiffener is coupled to the shell portion; and
third design data defining build parameters of a replacement insole arch stiffener removably couplable to the shell portion, wherein the build parameters of the replacement insole arch stiffener include parameters to modify the stiffness of the insole when the replacement insole arch stiffener is coupled to the shell portion; and
operating an additive manufacturing apparatus to generate the shell portion of the insole according to the first design data, the insole arch stiffener according to the second design data, and the replacement insole arch stiffener according to the third design data,
wherein either the insole arch stiffener is coupled to the shell portion or the replacement insole arch stiffener is coupled to the shell portion at a given time, such that the insole is comprised of the shell portion and the insole arch stiffener or the replacement insole arch stiffener that is currently coupled to the shell portion,
and wherein the replacement insole arch stiffener modifies the stiffness of the insole differently than the insole arch stiffener.

2. The computer-implemented method of claim 1, further comprising:
receiving activity data indicative of an intended use activity of the article of footwear with which the insole is to be used,
wherein the first design data is generated based further on the received activity data.

3. The computer-implemented method of claim 1, wherein the insole arch stiffener having the build parameters defined by the second design data comprises a single discrete portion removably couplable to the shell portion,
and wherein the replacement insole arch stiffener having the build parameters defined by the third design data comprises multiple discrete portions that are separately removably couplable to the shell portion.

4. A non-transitory machine-readable medium comprising instructions executable by a processor to perform processing comprising:
receiving biomechanical data relating to a foot of a subject;
generating, based on the received biomechanical data:
first design data defining build parameters of a shell portion of an insole for an article of footwear;
second design data defining build parameters of an insole arch stiffener of the insole, the insole arch stiffener removably couplable to the shell portion, wherein the build parameters of the insole arch stiffener include parameters to modify a stiffness of the insole when the insole arch stiffener is coupled to the shell portion; and third design data defining build parameters of a replacement insole arch stiffener removably couplable to the shell portion of the insole, wherein the build parameters of the replacement insole arch stiffener include parameters to modify the stiffness of the insole when the replacement insole arch stiffener is coupled to the shell portion instead of the insole arch stiffener; and operating an additive manufacturing apparatus to generate the shell portion of the insole according to the first design data and to generate the insole arch stiffener according to the second design data, wherein the insole is initially comprised of the shell portion and the insole arch stiffener currently coupled to the shell portion, wherein the replacement insole arch stiffener is to replace the insole arch stiffener in the insole, such that at a given time either the insole arch stiffener is coupled to the shell portion or the replacement insole arch stiffener is coupled to the shell portion, and wherein the replacement insole arch stiffener modifies the stiffness of the insole differently than the insole arch stiffener having the build parameters defined by the second design data.

5. The non-transitory machine-readable medium of claim 4, further comprising:

receiving activity data indicative of an intended use activity of the article of footwear with which the insole is to be used, wherein the first design data is generated based further on the received activity data.

6. The non-transitory machine-readable medium of claim 4, wherein the insole arch stiffener having the build parameters defined by the second design data comprises a single discrete portion removably couplable to the shell portion, and wherein the replacement insole arch stiffener having the build parameters defined by the third design data comprises multiple discrete portions that are separately removably couplable to the shell portion.

* * * * *